(12) United States Patent
Mohr et al.

(10) Patent No.: US 6,787,023 B1
(45) Date of Patent: Sep. 7, 2004

(54) METAL-CONTAINING MACROSTRUCTURES OF POROUS INORGANIC OXIDE, PREPARATION THEREOF, AND USE

(75) Inventors: Gary David Mohr, League City, TX (US); Wilfried Jozef Mortier, Kessel-lo (BE); Xiaobing Feng, League City, TX (US); Per Johan Sterte, Lulea (SE); Lubomira Borislavova Tosheva, Lulea (SE)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/574,432

(22) Filed: May 20, 2000

Related U.S. Application Data

(60) Provisional application No. 60/135,326, filed on May 20, 1999.

(51) Int. Cl.[7] .......................... B01J 29/06; B01J 29/08; B01J 29/40; B01J 29/60; B01J 29/70

(52) U.S. Cl. .................. 208/27; 208/120.01; 208/135; 423/212; 423/213.2; 423/239.1; 423/239.2; 423/245.1; 423/247; 502/60; 502/64; 502/77; 502/78; 502/79; 502/300; 585/418; 585/467; 585/475; 585/481; 585/639; 585/653

(58) Field of Search .............................. 423/700, 701, 423/702, 716, 212, 213.2, 239.1, 239.2, 245.1, 247; 502/60, 64, 77, 78, 79, 300, 27, 120.01, 135; 585/481, 475, 467, 418, 639, 653; 208/27, 120.01, 135

(56) References Cited

U.S. PATENT DOCUMENTS

| | | | |
|---|---|---|---|
| 4,116,858 A | 9/1978 | Lee et al. | 252/184 |
| 4,670,303 A | 6/1987 | Miles | 427/213.31 |
| 4,680,170 A | * 7/1987 | Lowe et al. | 423/329 |
| 6,160,191 A | * 12/2000 | Smith et al. | 585/475 |
| 2002/0192155 A1 | * 12/2002 | Sterte et al. | 423/700 |

FOREIGN PATENT DOCUMENTS

| | | | |
|---|---|---|---|
| EP | 0103035 A1 | 3/1984 | C01D/15/00 |
| EP | 0201264 A1 | 12/1986 | C01B/33/28 |
| EP | 0217143 A2 | 4/1987 | B01J/39/02 |
| WO | WO8203571 | 10/1982 | B01J/29/06 |
| WO | WO9425151 | 11/1994 | B01J/20/18 |
| WO | WO9529751 | 11/1995 | B01D/71/02 |
| WO | WO96/07713 | 3/1996 | |
| WO | WO0000287 | 1/2000 | B01J/47/00 |
| WO | WO00/00287 | 6/2000 | |

OTHER PUBLICATIONS

U.S. patent app. Ser. No. 09/315,869, Sterte et al., filed on May 20, 1999.

Tosheva L et al.: "Silicate–1 containing microspheres prepared using shape–directing macro–templates", Microporous and Mesoporous Materials, US, Elsevier Science Publishing, New York, vol. 35–36, Apr. 2000, pp. 621–629, XP004194501; ISSN: 1387–1811; the whole document.

* cited by examiner

*Primary Examiner*—Wayne A. Langel

(57) ABSTRACT

There is provided a catalyst containing porous macrostructures comprised of: (a) a three-dimensional network of particles of porous inorganic material (e.g., zeolites); and, (b) at least one metal (e.g., a catalytically active metal). The particles of the at least one macrostructure occupy less than 75% of the total volume of the at least one macrostructure and are jointed together to form a three-dimensional interconnected network. The three-dimensional interconnected network will usually be comprised of pores having diameters greater than about 20 Å. The macrostructures can be made by forming an admixture containing a porous organic ion exchanger (e.g., a polymer-based ion exchange resin) and a synthesis mixture (e.g., for zeolite formation) capable of forming the porous inorganic material and the at least one metal; converting the synthesis mixture to the porous inorganic material; and removing the porous organic ion exchanger from the inorganic material. The metal-containing macrostructures find application in hydrocarbon conversion (e.g., hydrogenation, dehydrogenation, dehydrocyclization, isomerization, hydrocracking, dewaxing, reforming, conversion of alkyl aromatics, etc.) and in the reduction of emissions of hydrocarbons, carbon monoxide, and/or oxides of nitrogen from an internal combustion engine.

63 Claims, No Drawings

METAL-CONTAINING MACROSTRUCTURES OF POROUS INORGANIC OXIDE, PREPARATION THEREOF, AND USE

This application claims priority to U.S. Provisional Application No. 60/135,326, filed May 20, 1999, which is hereby incorporated by reference.

FIELD OF THE INVENTION

This invention relates to metal-containing macrostructures of porous inorganic oxide, methods of preparing the metal-containing macrostructures, and the use of the metal-containing macrostructures.

BACKGROUND OF THE INVENTION

Both mesoporous inorganic material and microporous inorganic material are characterized by a large specific surface area in pores and are used in a large number of applications of considerable commercial importance. In most of these applications, the fact that the phase interface between the solid porous materials and the medium (liquid or gas) in which it is used is large can be very important. For example, these porous inorganic materials are often used as catalysts and catalyst supports in hydrocarbon conversion processes. Also, these porous inorganic materials are often used as adsorbents for the selective adsorption in the gas or liquid phase or the selective separation of ionic compounds. As used herein, the terms "porous inorganic materials" and "porous materials" includes solid mesoporous inorganic material, solid microporous inorganic material, and mixtures thereof.

Although a large phase interface is often a fundamental requirement for use of porous materials in different applications, a number of additional requirements related to the particular area of application are imposed on these materials. For example, the large phase interface available in the pores of the porous inorganic material must be accessible and useable. In many applications, size and shape of the macrostructures containing the porous inorganic material and the degree of variation of these properties can be decisive importance. During use, the size and shape of the macrostructures can influence properties like mass transport within the structures, pressure drop over a bed of particles of the material, and the mechanical and thermal strength of the material. Techniques that permit production of a material with increased specific surface area, pore structure (pore size/pore size distribution), chemical composition, mechanical and thermal strength, as well as increased and uniform size and shape, are consequently required to tailor porous inorganic macrostructures to different applications.

Mesoporous inorganic materials include amorphous metal oxide (non-crystalline) materials which have mesoporous and optionally partially microporous structure. The pore size of the mesoporous inorganic material is usually in the range of from about 20 Å to about 500 Å.

Microporous inorganic materials include crystalline molecular sieves. The pore size of crystalline microporous molecular sieves is usually in the range of from about 2 Å to about 20 Å. Crystalline microporous molecular sieves, both natural and synthetic, such as zeolites, have been demonstrated to have catalytic properties for various types of hydrocarbon conversion processes. In addition, the crystalline microporous molecular sieves have been used as adsorbents and catalyst carriers for various types of hydrocarbon conversion processes, and other applications. These molecular sieves are ordered, porous, crystalline material having a definite crystalline structure as determined by x-ray diffraction, within which there are a large number of smaller cavities which may be interconnected by a number of still smaller channels or pores. The dimensions of these channels or pores are such as to allow adsorption of molecules with certain dimensions while rejecting those with larger dimensions. The interstitial spaces or channels formed by the crystalline network enable molecular sieves to be used as molecular sieves in separation processes, catalysts and catalyst supports in a wide variety of hydrocarbon conversion processes, and many other commercial processes.

Molecular sieves can be classified into various groups by their chemical composition and their structure. One group of molecular sieves is commonly referred to as zeolites. Zeolites are comprised of a lattice of silica and optionally alumina combined with exchangeable cations such as alkali or alkaline earth metal ions. Although the term "zeolites" includes materials containing silica and optionally alumina, the silica and alumina portions may be replaced in whole or in part with other oxides. For example, germanium oxide, titanium oxide, tin oxide, phosphorous oxide, and mixtures thereof can replace the silica portion. Boron oxide, iron oxide, titanium oxide, gallium oxide, indium oxide, and mixtures thereof can replace the alumina portion. Accordingly, the terms "zeolite", "zeolites" and "zeolite material", as used herein, shall mean crystalline microporous molecular sieves including, but not limited to, molecular sieves containing silicon and, optionally, aluminum atoms in the crystalline lattice structure thereof, molecular sieves which contain suitable replacement atoms for such silicon and aluminum, and ALPO-based molecular sieves which contain framework tetrahedral units of alumina ($AlO_2$) and phosphorous oxide ($PO_2$) and, optionally, silica ($SiO_2$). Examples of ALPO-based molecular sieves include SAPO, ALPO, MeAPO, MeAPSO, ELAPO, and ELAPSO. The term "aluminosilicate zeolite", as used herein, shall mean zeolites consisting essentially of silicon and aluminum atoms in the crystalline lattice structure thereof.

Prior to using the porous inorganic material, especially crystalline microporous molecular sieves such as zeolites, in hydrocarbon conversion, the material is usually formed into structures, e.g., aggregates, such as pills, spheres, tablets, pellets, or extrudates. For example, although zeolite crystals have good adsorptive properties, their practical applications are very limited because it is difficult to operate fixed beds with zeolite powder. Therefore, prior to using the zeolite crystals in commercial processes, mechanical strength is conventionally conferred on the zeolite crystals by forming a zeolite aggregate such as a pill, sphere, or extrudate which usually is a dimension greater than 0.01 mm. The extrudate can be formed by extruding the zeolite crystals in the presence of a non-zeolitic binder and drying and calcining the resulting extrudate. Another means for forming aggregates involves compressing the particles together to form aggregates where the particles are held together by physical means. The binder materials used are resistant to the temperatures and other conditions, e.g., mechanical attrition, which occur in various hydrocarbon conversion processes. It is generally necessary that the zeolite be resistant to mechanical attrition, that is, the formation of fines which are small particles, e.g., particles having a size of less than 20 microns. Examples of suitable binders include amorphous materials such as alumina, silica, titania, and various types of clays. Aggregates can also be formed without amorphous binder by compressing the crystals together in such a way that they become physically self bound.

Although such bound zeolite aggregates have much better mechanical strength than the zeolite powder, when the bound zeolite is used in a catalytic conversion process, the performance of the catalyst, e.g., activity, selectivity, activity maintenance, or combinations thereof, can be reduced because of the amorphous binder. For instance, since the binder is typically present in amounts of up to about 60 wt. % of the bound catalyst, the amorphous binder dilutes the adsorptive properties of the aggregate. In addition, since the bound zeolite is prepared by extruding or otherwise forming the zeolite with the amorphous binder and subsequently drying and calcining the extrudate, the amorphous binder can penetrate the pores of the zeolite or otherwise block access to the pores of the zeolite, or slow the rate of mass transfer to and from the pores of the zeolite which can reduce the effectiveness of the zeolite when used in hydrocarbon conversion processes and other applications. Furthermore, when a bound zeolite is used in catalytic conversion processes, the amorphous binder may affect the chemical reactions that are taking place within the zeolite and also may itself catalyze undesirable reactions which can result in the formation of undesirable products.

It is sometimes desirable that catalysts used for hydrocarbon conversion include one or more metals. For instance, certain hydrocarbon conversion processes involving dehydrogenation and dehydrocyclization reactions require that the catalyst be effective for metal-catalyzed reactions. In order for the catalyst to be effective for metal catalyzed reactions, at least one catalytically active metal is usually included in the catalyst. The catalytically active metal is preferably uniformly dispersed or the activity, selectivity, and/or activity maintenance of the catalyst can be adversely effected. Also, for shape selective hydrocarbon conversion reactions, such as aromatic disproportionation, alkylation, or transalkylation reactions, it is desirable to reduce reactions taking place at the surface sites of a zeolite catalyst. One technique for reducing those reactions is to coat the surface active sites with a metal compound effective for reducing the acidity, including metal oxides such as barium oxide.

It is desirable that the exterior surface of the support present in catalytic converters, which are used for the reduction of emissions in a gas stream of a combustion process, such as the exhaust stream from an internal combustion engine, contain at least one metal that is dispersed on the exterior surface of the support to reduce the amount emissions in the exhaust stream.

SUMMARY OF THE INVENTION

In one embodiment, the present invention is directed to a catalyst containing at least one porous macrostructure comprised of: (a) a three-dimensional network of particles of porous inorganic material; and, (b) at least one metal. The particles of the at least one macrostructure occupy less than 75% of the total volume of the at least one macrostructure and are joined together to form a three-dimensional interconnected network comprised of pores and at least some of the pores will usually have diameters greater than about 20 Å.

In another embodiment, the present invention is directed to a process for preparing the catalyst containing the at least one macrostructure comprised of: (a) the three-dimensional network of particles of porous inorganic material; and, (b) the at least one metal. The process is carried out by: (i) forming an admixture comprising a porous organic ion exchanger and a synthesis mixture capable of forming the porous inorganic material; (ii) converting the synthesis mixture to the porous inorganic material; and (iii) removing the porous organic ion exchanger. In this embodiment, the at least one metal is present on the porous organic ion exchanger before forming the synthesis mixture of step (i), or the at least one metal is added to the admixture of step (i) during the preparation, after the formation, or both, of said admixture, or is added during the conversion of step (ii), or is added to said at least one macrostructure before the removal in step (iii) of the porous organic ion exchanger and after the formation in step (ii) of the porous inorganic material, or is added to said at least one macrostructure after the removal in step (iii) of the porous organic ion exchanger, or combinations thereof.

In an additional embodiment, the present invention is directed to the conversion of organic compounds by contacting the organic compounds under conversion. conditions with the catalyst comprised of: (a) the at least one macrostructure comprised of the three-dimensional network of particles of porous inorganic material; and, (b) the at least one metal.

In a further embodiment, the present invention is directed to a process for reducing emissions of hydrocarbon, carbon monoxide, and particularly, oxides of nitrogen such as those contained in a gas stream, such as a gas stream from an exhaust system of an internal combustion engine. The process is carried out by contacting the gas stream from the exhaust system with the catalyst containing the at least one macrostructure comprised of: (a) the three-dimensional network of particles of porous inorganic material; and, (b) the at least one metal.

DETAILED DESCRIPTION OF THE INVENTION

Macrostructures refer to structures with a size that exceeds 0.01 mm in at least one dimension, preferably 0.1 mm and, more preferably, 1.0 mm. Examples of macrostructures are spherical particles, cylindrical extrudates, pellets, fibers, thin films applied to different forms of substrates and other composites, in which the porous material is combined with other types of material.

The term "average particle size" as used herein, means the arithmetic average of the diameter distribution of the particles on a volume basis. Procedures for determining the volume of the particles are known to persons skilled in the art. For instance, the volume of the particles can be calculated from SEM particle size measurements by taking into account the geometry of the particles. The term "particle" means the fundamental building block of the macrostructure material. In the case of crystalline molecular sieves, particle refers to crystal. In the case of other porous materials, particle refers the fundamental building block of these materials.

As used herein, the term "metal" refers to a metal that: (a) is present on the internal surface of the macrostructure or the external surface of the macrostructure, or both; and (b) affects the catalytic properties of the particles of the macrostructure or affects the adsorptive properties of the particles of the macrostructure, or both. The term "metal" does not encompass metal from which the porous inorganic material is comprised. For example, in the case of crystalline microporous molecular sieves, the term "metal" does not encompass any metal in the framework of the crystalline molecular sieve.

The macrostructure will comprise at least one metal, be porous and will usually comprise a three-dimensional network (sometimes referred to as a matrix) of particles of porous inorganic oxide. The macrostructures can be self supporting and is self bound. Usually, the particles will occupy less than 75% of the total volume of the macrostructures and may occupy less than 50% of the total volume of the macrostructure. The expression "total volume", as used herein, means the volume displaced by macrostructure material if all pores within the macrostructure were filled with non-porous material.

Usually, the particles will have an average particle size of less than 2 microns, and preferably less than 500 nm. More preferably, the particles will have an average particle size of less than 200 nm, e.g., 100 nm. The particles of the macrostructure will be joined together to form a three-dimensional interconnected network comprised of pores and at least some of the pores will usually have diameters greater than about 20 Å. The network can be mesoporous, macroporous, or both. A macroporous network has pores greater than 500 Å. For example, with respect to macrostructures comprised of molecular sieve, where the molecular sieve has internal micropores of less than 20 Å in diameter, the network porosity is external to the particles. The porosity of the network may not be uniform. For example, the macrostructure may be combinations of mesoporous, macroporous, and hollow. Usually, the particles are joined together by means other than by physical binding of the particles. In most instances, the particles are joined together as a result of the synthesis of the macrostructure. Because of its high porosity, the macrostructure will usually have a density of less than 0.50 g/cc and in some instances, the density will be less than 0.30 g/cc. Procedures for determining the density, mesoporosity, microporosity, and particle size distribution of the macrostructure are know to persons skilled in the art. Examples of such procedures are described in *Handbook of Heterogeneous Catalyst* by G. Ertl, H. Knozinger, and J. Weitkamp (1997).

Porous inorganic materials that find application in the process of the present invention include crystalline molecular sieves (zeolites) and mesoporous materials. Examples of mesoporous material that find particular use include amorphous materials such as amorphous silica, amorphous alumina, amorphous aluminosilicates and mesoporous molecular sieves such as MCM-41 and MCM-48. For some applications, it is preferable that the pore size of the mesoporous inorganic material be in the range of from about 20 Å to about 200 Å.

Crystalline molecular sieves that find application include any of the naturally occurring or synthetic molecular sieves. Examples of these molecular sieves include large pore molecular sieves, intermediate pore size molecular sieves, and small pore molecular sieves. These molecular sieves and their isotypes are described in "Atlas of Zeolite Structure Types", eds. W. H. Meier, D. H. Olson and Ch. Baerlocher, Elsevier, Fourth Edition, 1996, which is hereby incorporated by reference. A large pore molecular sieve generally has a pore size of at least about 7 Å and includes LTL, VFI, MAZ, MEI, FAU, EMT, OFF, *BEA, BOG, and MOR structure type zeolites (IUPAC Commission of Zeolite Nomenclature). Examples of large pore molecular sieves include mazzite, offretite, zeolite L, VPI-5, zeolite Y, zeolite X, omega, Beta, ZSM-3, ZSM-4, ZSM-18, ZSM-20, MCM-9, SAPO-37, and ETS-10, ETAS-10, ETGS-10, and AM-6. An intermediate pore size molecular sieves generally has a pore size from about 5 Å to about 7 Å and includes, for example, MFI, MEL, MTW, EUO, MTT, MFS, AEL, AFO, HEU, FER, and TON structure type zeolites (IUPAC Commission of Zeolite Nomenclature). Examples of intermediate pore size molecular sieves include ZSM-5, ZSM-11, ZSM-12, ZSM-22, ZSM-23, ZSM-34, ZSM-35, ZSM-38, ZSM-48, ZSM-50, ZSM-57, MCM-22, MCM-36, MCM-49, MCM-56, MCM-68, silicalite 1, and silicalite 2. A small pore size molecular sieves has a pore size from about 3 Å to about 5.0 Å and includes, for example, CHA, ERI, KFI, LEV, GIS, and LTA structure type zeolites (IUPAC Commission of Zeolite Nomenclature). Examples of small pore molecular sieves include ZK-4, ZSM-2, SAPO-34, SAPO-35, ZK-14, SAPO-42, ZK-21, ZK-22, ZK-5, ZK-20, zeolite A, hydroxysodalite, erionite, chabazite, zeolite T, gmelinite, ALPO-17, and clinoptilolite.

The structure type of the zeolite and/or its composition of the zeolite will depend on its use. Macrostructures comprised of zeolite do not require the presence of significant amounts of amorphorous binder materials to bind together the zeolite crystals. Thus, macrostructures comprised of zeolite crystals can contain less than 10% by weight of amorphous binder material based on the weight of the macrostructures. For many applications, these macrostructures will contain even lesser amounts of amorphous binder, e.g., 5% by weight and even less, e.g., the macrostructures can be substantially free of non-zeolitic binder.

The zeolites can include silicates, metallosilicates such as aluminosilicates and gallosilicates, and ALPO-based molecular sieves such as alumino-phosphates (ALPO), silicoaluminophosphates (SAPO), metalloalumino-phosphates (MeAPO), and metalloaluminophospho-silicate (MeAPSO)

When the zeolite is an crystalline metallosilicate, the chemical formula of anhydrous crystalline metallosilicate can be expressed in terms of moles as represented by the formula: $M_{2/n}O:W_2O_3:ZSiO_2$, wherein M is selected from the group consisting of proton, e, g, hydrogen, proton precursors, monovalent, divalent, and trivalent cations and mixtures thereof; n is the valence of the cation and Z is a number of at least 2, preferably at least 3, said value being dependent upon the particular type of zeolite, and W is a metal in the anionic framework structure of the zeolite such as aluminum, gallium, boron, or iron.

When the zeolite has an intermediate pore size, the zeolite preferably comprises a composition having the following molar relationship:

$$X_2O_3:(n)YO_2,$$

wherein X is a trivalent element, such as aluminum, gallium, titanium, iron, and/or boron, Y is a tetravalent element such as silicon, tin, and/or germanium; and n has a value greater than 10, usually 20 or greater, more usually from 50 to 2,000, said value being dependent upon the particular type of zeolite and the trivalent element present in the zeolite.

As known to personals skilled in the art, the acidity of a zeolite can be reduced using many techniques such as by dealumination and steaming. In addition, the acidity of a zeolite is dependent upon the form of the zeolite with the hydrogen form having the highest acidity and other forms of the zeolite such as the sodium form having less acidity than the acid form. Accordingly, the mole ratios of silica to alumina and silica to gallia disclosed herein shall include not only zeolites having the disclosed mole ratios, but shall also include zeolites not having the disclosed mole ratios but having equivalent catalytic activity.

When the zeolite is a gallosilicate intermediate pore size zeolite, the zeolite preferably comprises a composition having the following molar relationship:

$$Ga_2O_3:ySiO_2$$

wherein y is greater than about 20, typically from 20 to 200. The zeolite framework may contain only gallium and silicon atoms or may also contain a combination of gallium, aluminum, and silicon.

When the zeolite is an aluminosilicate zeolite, the silica to alumina mole ratio will usually depend upon the structure type of the zeolite and the particular hydrocarbon process in which the catalyst system is utilized and is therefore not limited to any particular ratio. Generally, however, and depending on the structure type of the zeolite, the zeolite will have a silica to alumina mole ratio of at least 2:1 and in some instances from 4:1 to about 7:1. For a number of zeolites, especially intermediate pore size zeolites, the silica to alumina mole ratio will be in the range of from about 10:1 to about 1,000:1 or even greater where the zeolite contains no more than trace amounts of alumina. For example, the zeolite can be silicalite 1, i.e., a MFI type substantially free of alumina, or silicalite 2, a MEL type substantially free of alumina. When the catalyst is utilized in acid catalyzed reactions such as cracking, the manufacture of paraxylene and benzene by the disproportionation of toluene, the alkylation of benzene or the like, the zeolite will be acidic and will preferably, when it is an intermediate pore size zeolite, have higher silica to alumina mole ratios, e.g., 20:1 to about 200:1.

The macrostructures will contain at least one metal. Such metals are known to persons skilled in the art and include metals of Groups IA, IIA, IIIA, IVA, VA, VIA, VIIA, VIII, IB, IIB, IIIB, IVB, VB, VIB, and VIIB of the Periodic Table of the Elements. The metal or metals in the macrostructure can be present in the elemental state (i.e. zero valent) or in some other form such as an oxide, sulfide, halide, is carboxylate and the like.

In a preferred embodiment, the macrostructures will contain at least one hydrogenation/dehydrogenation metal and will be used in a conversion process or combination of processes which employs hydrogenation/dehydrogenation metal. Examples of such processes include hydrogenation, dehydrogenation, hydrocracking, dehydrocyclization, isomerization, cracking, dewaxing, reforming, conversion of alkylaromatics, oxidation, synthesis gas conversion, hydroformylation, dimerization, polymerization, and alcohol conversion.

Examples of suitable hydrogenation/dehydrogenation metals include Group VIII metals (i.e., Pt, Pd, Ir, Rh, Os, Ru, Ni, Co and Fe), Group IVA metals (i.e., Sn and Pb), Group VA metals (i.e., Sb and Bi), and Group VIIB metals (i.e., Mn, Tc and Re). Noble metals (i.e., Pt, Pd. Ir, Rh, Os and Ru) are sometimes preferred. Reference to the metal or metals is intended to encompass such metal or metals in the elemental state (i.e. zero valent) or in some other catalytically active form such as an oxide, sulfide, halide, carboxylate and the like.

In another preferred embodiment, the surface active sites of zeolite crystals in the macrostructure will contain at least one metal or metal compound that is effective in reducing undesirable reactions and will be used for shape selective hydrocarbon conversion reactions, Examples of such reactions include aromatic disproportionation (toluene disproportionation), alkylation, and transalkylation reactions.

Metal/metal compounds effective for reducing surface acidity on the surface of zeolite crystals include alkali metal elements of Group IA (Li, Na, K, Rb, and Cs) alkaline-earth metals (Ca, Ba, and Hg), Group IB metals (Cu, Ag, and Au), Group IIB metals (Zn, Cd, and Au), Group IIIA metals (Sc, Y, and the rare earth elements [La, Ce, Pr, Nd, Pm, and Sm, and the yttrium group]), Group IIIB metals (Al, Ga, In, and Tl), Group IVB metals (Ti, Zr, Hf), Group IVA metals (Ge, Sn, Pb), Group VA metals (V, Nb, and Ta), Be, Mg, Sb, Si, B, Group VIB metals (Cr, Mo, and W), Group VIIA metals (Mn and Re). Reference to the metal or metals is intended to encompass such metal or metals in the elemental state (i.e. zero valent) or in some other form effective for reducing the surface active sites, such as oxides, sulfides, acetates, chlorides, fluorides, and nitrates.

In another preferred embodiment, the metal-containing macrostructures will contain at least one metal effective for partial oxidation of hydrocarbons. Preferred metals include one or more noble metals, nickel, vanadium, cobalt, chromium, and iron, e.g., vanadium pentaoxide, ferric oxide, and ferris oxide. The metal-containing macrostructures will be used for the partial oxidization of hydrocarbons with oxidants, e.g. oxygen, air, hydrogen peroxide, t-butyl hydrogen peroxide, to form oxidized hydrocarbon products, such as alcohol, ketone, carboxylic acid in gas phase reaction or liquid phase reaction.

In another preferred embodiment, metal-containing macrostructures will contain at least one metal effective for reducing exhaust emissions such as one or more noble metals, nickel, and metal oxides such as vandium pentooxide and will be used for reducing undesirable emissions from a gas stream such as the gas stream from an internal combustion engine.

The amount of metal present in the macrostructure catalyst will is be an effective amount which will vary depending on use. The amount will generally be from about 0.001 to about 10 percent by weight and, preferably 0.05 to 5.0 percent by weight. Also the amount will vary with the nature of the metal and whether the metal is for dehydrogenation/hydrogenation, to reduce surface acidity, or some other purpose. For example, in reducing exhaust emissions, it may sometimes be desirable to use high levels of metal.

In preparing the metal-containing macrostructures, the metal will usually be included in the porous organic ion exchanger prior to forming the admixture with the synthesis mixture capable of forming the porous inorganic material. The metal can included with the porous organic ion exchanger using techniques such as, physical mixing, incipient wetness, vapor phase addition, and ion exchange. Another technique for including the metal involves co-extruding the metal with the porous organic ion exchanger.

Metal-containing macrostructures prepared by this method may contain increased amounts of metal. Also, the metal-containing macrostructures can be tailored for intended use. For example, an ion exchanger could be extruded into the size and shape of a catalytic converter monolith. Subsequently, one or more metals, e. g., noble metals, can then be added to the ion exchanger such as by ion exchange. Next, amorphous material or molecular sieve can be formed in the resin. Finally, the ion exchanger can be removed by calcination leaving behind a monolith containing dispersed metals. If additional strength is needed, the ion exchanger can be extruded along with fibers to form the ion exchanger on a high strength support or resin coated supports can be used.

Preferably, the metal-containing macrostructures of porous organic material are prepared by the following steps:
(a) adding at least one metal to a porous organic ion exchanger. If desired, large amounts can be added and after the removal of the ion exhanger, high levels of dispersed metals will remain on the macrostructure;
(b) forming a admixture containing the porous organic ion exchanger and a synthesis mixture capable of forming said porous inorganic material and which occupies at least a portion of the pore space of the porous organic ion exchanger;

(c) converting said synthesis mixture in the pores of the porous organic ion exchanger under hydrothermal conditions to form the porous inorganic material; and, (d) removing said porous organic ion exchanger.

The composition of the synthesis mixture will vary according to the porous inorganic material of the macrostructure. For example, in making macrostructures of silicalite 1 or silicalite 2, the aqueous synthesis mixture will contain a source of silicon, and will usually contain a structure directing agent. When preparing an aluminosilicate zeolite, the aqueous synthesis mixture will contain sources of silica and alumina and will usually contain a structure directing agent. When the porous inorganic material to be produced is an ALPO-based molecular sieve, the aqueous synthesis mixture will contain sources of aluminum and phosphorus, optionally silicon and will usually contain a structure directing agent.

The porous organic ion exchanger can be removed using techniques know to persons skilled in the art. Examples of such techniques include oxidation processes such as calcination and chemical removal such as by chemical destruction or chemical dissolution. Usually, the removal of the porous organic ion exchanger will result in macrostructures with the size and shape of the employed organic ion exchanger. The metal will usually be located on the surface of the porous inorganic oxide. After removal of the ion exchanger, the metal can be sulfided, oxidized, reduced or the like.

Also, in some instances, the metal may be treated to convert it into a different material. For example, if the metal is aluminum, the alumina [aluminum oxide] can be treated in the presence of silica, phosphate, or both, under suitable conditions to convert it into crystalline microporous molecular sieve. If only silica is present on the surface of the macrostructure, the silica can be treated to convert it into crystalline microporous molecular sieve, after conversion the resulting macrostructure can have a coating that covers at least a portion of the external surface of the macrostructure. The composition, structure type, or both of the coating can be the same or different from the microporous inorganic material of the macrostructure, e.g., the macrostructure can be comprised of molecular sieve crystals with a structure of MFI, e.g., ZSM-5, and the coating can be silicalite 1 or silicalite 2. Conversion of the silica coating to silicalite 1 or silicalite 2 coating can be carried out by aging the macrostructure at elevated temperatures in an aqueous ionic solution containing a source of hydroxy ions sufficient to convert the silica coating to silicalite 1 or silicalite 2. Usually, the aqueous ionic solution will contain a template.

For the manufacture of a MFI structure type zeolite, especially ZSM-5 or silicalite, e.g., silicalite 1, the synthesis mixture is advantageously of a molar composition, calculated in terms of oxides, within the following ranges:

| | |
|---|---|
| $M_2O:SiO_2$ | 0 to 0.7 to :1 preferably 0.016 to 0.350:1 |
| $SiO_2:Al_2O_3$ | 12 to infinity:1 |
| $(TPA)_2O:SiO_2$ | 0 to 0.2:1 preferably 0 to 0.075:1 |
| $H_2O:SiO_2$ | 7 to 1000:1 preferably 9 to 300:1 | wherein TPA represents tetrapropylammonium and M is an alkali metal, preferably sodium or potassium, also Li, Cs and ammonia. Other template agents may be used in these ratios.

The organic ion exchangers suitable for preparing the macrostructures are organic porous materials with a surface charge and ion exchange capacity for anions or cations. Preferably, the organic ion exchangers are polymer-based which are sometimes referred to as ion exchange resins. Polymer-based ion exchangers are commercially available or can be readily prepared from resins that are commercially available. Examples of such resins include resins sold by Rohm and Haas Company under the registered trademark AMBERLYST (ion exchange resin) and resins sold by the Dow Chemical Company under the registered trademark DOWEX (ion exchange resin). These exchangers cover a broad spectrum of different cation and anion exchangers with varying ion exchange capacity, porosity, pore size and particle size. Ion exchangers with an apparent anion exchange capacity, typically greater than about 1 mEq/g of dry anion exchanger, are of special interest to the present invention. Macroreticular organic ion exchangers are particularly preferred in the practice of the present invention. By "macroreticular" as the term is commonly used in the resin art, it is generally meant that the pores, voids, or reticules are substantially within the range of about 200 to about 2,000 Å. Macroreticular resins are also referred to as macroporous resins.

A preferred group of ion exchangers suitable for use in the process of the present invention are anion exchange resins comprising water-insoluble polymeric resins having attached thereto a plurality of active anion exchange sites. The resin generally contains sufficient of such active ion exchange groups to impart thereto a concentration of ion exchange sites in the range from about 0.5 to about 12 mEq/g dry resin, typically greater than 1 mEq/g, and in some cases, preferably from about 4 to about 5.5 mEq/g of dry resin.

Anion-exchange resins are characterized as either strong base or weak base anion-exchange resins depending on the active ion-exchange sites of the resin. Strong base anion-exchange resins consist of polymers having mobile monovalent anions, such as hydroxide and the like associated for example with covalently bonded quaternary ammonium, phosphonium or arsonium functional groups or tertiary sulfonium functional groups. These functional groups are known as active sites and are distributed over the surface of the resin particle. Strong base anion-exchange resins have the capacity to undergo ion exchange independent of the pH of the medium by virtue of their intrinsic ionic character. Macroreticular strong base anion-exchange resins in the hydroxide form are particularly preferred in the practice of the present invention.

The resin matrix of weak base anion-exchange resins contains in chemically bonded thereto a basic, nonionic functional group. The functional groups include primary, secondary, or tertiary amine groups. These may be aliphatic, aromatic, heterocyclic or cycloalkane amine groups. They may also be diamine, triamine, or alkanolamine groups. The amines, for example, may include alpha, alpha-dipyridyl, guanidine, and dicyanodiamidine groups. Other nitrogen-containing basic, non-ionic functional groups include nitrile, cyanate, isocyanate, thiocyanate, isothiocyanate, and isocyanide groups. Pyridine groups may also be employed.

Ion exchangers of the strongly basic type which contain quaternary ammonium groups, have been found to be particularly suited for use in the present invention. Commercially available ion exchangers are generally in the form of spherical particles with a relatively narrow particle size distribution. Organic ion exchangers with a size and shape other than spherical, for example, fibers or flakes, however, can be produced according to known techniques. It is also known that films of organic ion exchangers can be deposited on different forms of substrates.

The term "seeds" refers to particles, e.g., crystallites, of porous inorganic material, e.g., zeolites, that are capable of initiating crystallization of the desired porous inorganic material. The seeds, which can be present in the synthesis mixture before its synthesis, e.g., seeds can be added to the synthesis mixture, or can be formed in situ usually in the early stage of synthesis of the porous inorganic material and are characterized by the fact that by treatment of the synthesis mixture with appropriate concentration and under suitable conditions, the seeds can be made to grow and form individual particles, e.g., crystals, which may join together during the synthesis to form a macrostructure in the pore system of the ion exchanger. Examples of such seeds includes silicate seeds, metal silicate seeds such as aluminosilicate, borosilicate, gallosilicate, and iron silicate seeds, SAPO seeds, and ALPO seeds. Preferred seeds include olgomeric anions of silicates and metal silicates. The term "seeds" also includes microcrystals of porous inorganic material, e.g., crystals of molecular sieves with a size below 500 nm, e.g., 200 nm, and whose crystal structure can be identified by X-ray diffraction. Microcrystals of molecular sieves suitable for use in the process of the present invention are disclosed in U.S. Pat. No. 5,863,516, which is hereby incorporated by reference.

Although not intending to limit the invention in any way to any theory of operation, it is believed that one of the advantages of preparing the metal-containing macrostructures using the porous organic ion exchanger is that the surface of the porous organic ion exchanger can facilitate nucleation of the synthesis mixture by causing the formation of seeds which can subsequently grow into a porous inorganic matrix. In line with this theory, it is believed that the surface charge of the porous organic ion exchanger can attract seeds or seed forming material onto the surface of the porous the ion exchanger. Also, the ion exchanger charges can attract metal cations to the surface of the ion exchanger which can result in the macrostructures having dispersed metal on its surface.

During the formation of the porous macrostructures using the porous organic ion exchanger, the seeds formed on or bonded to the surface in the organic ion exchanger are made to grow by hydrothermal treatment in an appropriate synthesis solution. Through this growth an interconnected three-dimensional network of porous material is formed in the pore structure of the employed ion exchanger as particles grow and join together during the synthesis. After this stage, the product is a composite material comprising two continuous three-dimensional networks, one comprising the polymer structure of the ion exchanger, and the second comprising the formed inorganic porous material. Introduction of seeds can be carried out physically in a separate stage, with a subsequent growth stage under hydrothermal conditions in a synthesis solution. However, it is also possible and often advantageous not to separate these stages, but instead to directly introduce the ion exchanger material into a synthesis solution and expose this to hydrothermal conditions, during which seeds are formed in or ion-exchanged from the synthesis solution to the ion exchanger, to then grow the material into a interconnected three dimensional macrostructure.

The microporous molecular sieve is usually produced by hydrothermal treatment of a synthesis mixture. Hydrothermal treatment refers to treatment in aqueous solution or aqueous suspension at a temperature exceeding 50° C., preferably exceeding 80° C. and, in most cases, exceeding 95° C. In some instances, it is preferable to carry out the hydrothermal treatment first at a lower temperature and then at a higher temperature. In the synthesis of some zeolites, e.g., silicalite 1, the crystallinity can be increased when the hydrothermal treatment is carried out in two steps. In the initial step, the temperature is lower, e.g., 90–110° C., than the second step, e.g., 150–165° C.

The composition of the mixture and the synthesis parameters, like temperature, time and pressure, can effect the product obtained as well as the size and shape of the formed crystals. The material deposited in the pore system of the organic ion exchanger can vary depending on the composition of the synthesis mixture and the synthesis conditions. During crystallization of macrostructures of a given molecular sieve, it is sometimes desirable to use synthesis mixtures, which, in the absence of ion exchanger material, result in colloidal suspensions of the molecular sieve. In some instances, the ion exchanger material can influence the result of the synthesis.

In preparing the metal-containing macrostructures, the metal can be added after preparation or during preparation at any one or more of the preparation stages or onto the ion exchanger before preparation begins. Non-limiting examples of metal addition include the following:

1. The metal can be added directly to the porous organic ion exchanger such as by deposition, e.g., incipient wetness, adsorption, or ion exchange before synthesis of the porous inorganic metal.
2. The metal can be added directly to the admixture containing the porous organic ion exchanger and the synthesis mixture capable of forming the porous inorganic material.
3. The metal can be added, such as by ion exchange, to the synthesized porous inorganic material prior to the removal of the porous organic ion exchanger.
4. The metal can be added, such as by ion exchange, to the synthesized porous inorganic material after the porous organic ion exchanger has been removed. The metal can even be added to the macrostructures after they have undergone further processing, e.g., formed into aggregates.

After removal of the porous organic ion exchanger, the resulting inorganic macrostructure is usually very similar or even a replica in size and shape of the organic ion exchanger present in the synthesis admixture. The secondary pore structure of the macrostructure will usually remain following removal of the organic ion exchanger material. The macrostructure however, can be further treated after removal such as by deposition of the porous inorganic material on the macrostructure. For instance, zeolite can be deposited into a zeolite macrostructure, e.g., the secondary pore structure can be more or less filled and, in the extreme case, leave behind a homogeneous porous material.

The metal-containing macrostructures can be used in processing hydrocarbon feedstocks. Hydrocarbon feedstocks contain carbon compounds and can be from many different sources, such as virgin petroleum fractions, recycle petroleum fractions, tar sand oil, and, in general, can be any carbon containing fluid able to react catalytically. Depending on the type of processing the hydrocarbon feed is to undergo, the feed can contain metal or can be free of metals. Also, the feed can also have high or low nitrogen or sulfur impurities.

The conversion of hydrocarbon feeds can take place in any convenient mode, for example, in fluidized bed, moving bed, CSTR, or fixed bed reactors depending on the types of process desired.

The metal-containing macrostructures can be used as a catalyst for a variety of organic, e.g., hydrocarbon compound conversion processes including hydrogenation, dehydrogenation, dehydrocyclization, isomerization, hydrocracking, dewaxing, reforming, conversion of alkyl aromatics, oxidation, reforming, synthesis gas conversion, hydroformylation, dimerization, polymerization, alcohol conversion, partial oxidation of hydrocarbons, etc.

Catalytic conversion conditions for hydrogenation of feedstocks such as alkenes, dienes, polyenes, alkynes, cyclenes, aromatics, oxygenates, etc. include a temperature of between about 0° F. and about 1000° F., preferably between about 80° F. and 900° F., a pressure of between about 10 psia and about 1000 psia, preferably between about 20 psia and 200 psia, a hydrogen/feed mole ratio of between about 0.1 and 20, preferably between about 4 and 12 and a LHSV of between about 0.1 and 20, preferably between about 0.5 and 4.

Dehydrogenation conditions, for processes such as conversion of paraffins to the corresponding olefins, or ethyl benzene to styrene, optionally in the presence of steam or inert gases such as nitrogen, include temperatures of from about 400° F. to 1800° F., preferably from about 650° F. to 1000° F.; feedstock partial pressures of from about 10,000–1500 psia, preferably from about 2 psia to 20 psia and a LHSV of from about 0.1 to 100, preferably between about 0.5 and 4.

Dehydrocyclization conditions, for example for conversion of paraffins to aromatics (e.g., octane to ethylbenzene or xylene), include temperatures of from about 400° F. to 1800° F., preferably from about 600° F. to 1100° F.; feedstock partial pressures of from about 1 psia to 1500 psia, preferably from about 2 psia to 20 psia) and a LHSV of from about 0.1 to 100, preferably between about 0.5 and 4.

Isomerization of normal paraffins, with or without hydrogen, is generally conducted at a temperature of between about 200° F. and 1000° F., preferably between about 400° F. and 900° F., a LHSV of between about 0.01 and 20, preferably between about 0.25 and 5 and a hydrogen to hydrocarbon mole ratio of between 0 and 5:1.

Catalytic conversion conditions for cracking, with or without hydrogen, include a temperature of between about 1200° F. and about 100° F., a pressure of between about 25 psia and about 2500 psia, a hydrogen/feed mole ratio of between about 0 and about 80 and a LHSV of between about 0.1 and about 10.

The metal-containing macrostructures are also useful in dewaxing operations. Likewise, the invention can be used in reforming catalysts or as part of a reforming catalyst. Dewaxing and reforming can be carried out in the presence or absence of hydrogen under conditions which include a temperature of from about 200° F. to 1100° F., preferably from about 800° F. to 950° F.; a pressure of from 1.5 psia to 1470 psia and a WHSV of from about 0.01 to about 100, preferably from about 0.1 to 10.

Thus, exemplary hydrocarbon conversion processes which find particular application include the following:

(A) The catalytic cracking of a naphtha feed to produce light olefins. Exemplary reaction conditions include from about 500° C. to about 750° C., pressures of subatmospheric or atmospheric, generally ranging up to about 10 atmospheres (gauge) and residence time (volume of the catalyst, feed rate) from about 10 milliseconds to about 10 seconds.

(B) The catalytic cracking of high molecular weight hydrocarbons to lower molecular weight hydrocarbons. Exemplary reaction conditions for catalytic cracking include temperatures of from about 400° C. to about 700° C., pressures of from about 0.1 atmosphere to about 30 atmospheres, and weight hourly space velocities of from about 0.1 to about 100 hr$^{-1}$.

(C) The isomerization of aromatic (e.g., xylene) feedstock components. Exemplary reaction conditions for such include a temperature of from about 230° C. to about 510° C., a pressure of from about 0.5 atmospheres to about 50 atmospheres, a weight hourly space velocity of from about 0.1 to about 200 and a hydrogen/hydrocarbon mole ratio of from about 0 to about 100.

(D) The hydrocracking of heavy petroleum feedstocks, cyclic stocks, and other hydrocrack charge stocks. The zeolite catalyst system will contain an effective amount of at. least one hydrogenation component of the type employed in hydrocracking catalysts.

(E) The conversion of light paraffins to olefins and/or aromatics. Exemplary reaction conditions include temperatures from about 425° C. to about 760° C. and pressures from about 10 to about 2000 psig.

(F) The conversion of light olefins to gasoline, distillate and lube range hydrocarbons. Exemplary reaction conditions include temperatures of from about 175° C. to about 375° C. and a pressure of from about 100 to about 2000 psig.

(G) Two-stage hydrocracking for upgrading hydrocarbon streams having initial boiling points above about 200° C. to premium distillate and gasoline boiling range products or as feed to further fuels or chemicals processing steps. The first stage would be metal-containing macrostructures comprising one or more catalytically active metals, e.g., a Group VIII metal, and the effluent from the first stage would be reacted in a second stage using a second catalyst, e.g., crystalline molecular sieve with a structure of *BEA, comprising one or more catalytically active substances, e.g., a Group VIII metal, as the catalyst. Exemplary reaction conditions include temperatures from about 315° C. to about 455° C., a pressure from about 400 to about 2500 psig, hydrogen circulation of from about 1000 to about 10,000 SCF/bbl and a liquid hourly space velocity (LHSV) of from about 0.1 to 10;

(H) A combination hydrocracking/dewaxing process in the presence of the macrostructure catalyst comprising a hydrogenation component and a zeolite such as zeolite Beta. Exemplary reaction conditions include temperatures from about 350° C. to about 400° C., pressures from about 1400 to about 1500 psig, LHSVs from about 0.4 to about 0.6 and a hydrogen circulation from about 3000 to about 5000 SCF/bbl.

(I) The reaction of alcohols with olefins to provide mixed ethers, e.g., the reaction of methanol with isobutene and/or isopentene to provide methyl-t-butyl ether (MTBE) and/or t-amyl methyl ether (TAME). Exemplary conversion conditions include temperatures from about 20° C. to about 200° C., pressures from 2 to about 200 atm, WHSV (gram-olefin per hour gram-zeolite) from about 0.1 hr$^{-1}$ to about 200 hr$^{-1}$ and an alcohol to olefin molar feed ratio from about 0.111 to about 511.

(J) The conversion of naphtha (e.g., $C_6$–$C_{10}$) and similar mixtures to highly aromatic mixtures. Thus, normal and slightly branched chained hydrocarbons, preferably having a boiling range above about 40° C., and less than about 200° C., can be converted to products having a substantial higher octane number aromatics content by contacting the hydrocarbon feed with the catalytic macrostructure at a temperature in the range of from about 400° C. to 600° C., preferably 480° C. to 550° C. at pressures ranging from atmospheric to 40 bar, and liquid hourly space velocities (LHSV) ranging from 0.1 to 15.

(K) The conversion of oxygenates, e.g., alcohols, such as methanol, or ethers, such as dimethylether, or mixtures thereof to hydrocarbons including olefins and aromatics with reaction conditions including a temperature of from about 275° C. to about 600° C., a pressure of from about 0.5 atmosphere to about 50 atmospheres and a liquid hourly space velocity of from about 0.1 to about 100.

(L) The oligomerization of straight and branched chain olefins having from about 2 to about 5 carbon atoms. The oligomers which are the products of the process are medium to heavy olefins which are useful for both fuels, i.e., gasoline or a gasoline blending stock, and chemicals. The oligomerization process is generally carried out by contacting the olefin feedstock in a gaseous state phase with a macrostructure at a temperature in the range of from about 250° C. to about 800° C., a LHSV of from about 0.2 to about 50 and a hydrocarbon partial pressure of from about 0.1 to about 50 atmospheres. Temperatures below about 250° C. may be used to oligomerize the feedstock when the feedstock is in the liquid phase when contacting the macrostructure catalyst. Thus, when the olefin feedstock contacts the catalyst in the liquid phase, temperatures of from about 10° C. to about 250° C. may be used.

(M) The conversion of $C_2$ unsaturated hydrocarbons (ethylene and/or acetylene) to aliphatic $C_{6-12}$ aldehydes and converting said aldehydes to the corresponding $C_{6-12}$ alcohols, acids, or esters.

(N) The conversion of alkylaromatic hydrocarbons such as the dealkylation of ethylbenzene to benzene.

(O) The saturation of olefins having from 2 to 20 carbon atoms.

(P) The isomerization of ethylbenzene to xylenes. Exemplary conversion conditions include a temperature from 600°–800° F., a pressure of from 50 to about 500 psig and a LHSV of from about 1 to about 10.

(Q) The partial oxidation of hydrocarbons (e.g., cyclohexane, para-xylene, 2,6-dimethylnaphthalene) with oxidants, e.g. oxygen, air, hydrogen peroxide, t-butyl hydrogen peroxide, form oxidized hydrocarbon products, such as alcohol, ketone, aldehyde, carboxylic acid in gas phase reaction or liquid phase reaction. Exemplary conversion conditions include a temperature from 0° C. to 500° C., a pressure of from 0 to 500 psig and a LHSV of from 0.01 to 10 in a reactor, e.g., moving bed, fixed bed, or CSTR reactor.

In general, the catalytic conversion conditions over the catalyst independently and in combination include a temperature of from about 0° C. to about 760° C., a pressure of from about 0.1 atmosphere (bar) to about 200 atmospheres (bar), a weight hourly space velocity of from about 0.08 $hr^{-1}$ to about 2,000 $hr^{-1}$.

The metal-containing macrostructures can find particular application for isomerizing one or more xylene isomers in a $C_8$ aromatic feed containing ethylbenze to obtain ortho-, meta-, and para-xylene in a ratio approaching the equilibrium value while substantially converting ethylbenzene. Suitable isomerization conditions include a temperature in the range of 250° C.–600° C., preferably 300° C.–550° C., a pressure in the range 0.5–50 atm abs, preferably 10–25 atm abs, and a weight hourly space velocity (WHSV) of 0.1 to 100, preferably 0.5 to 50. Optionally, isomerization in the vapor phase is conducted in the in presence of 0.1 to 30.0 moles of hydrogen per mole of alkylbenzene. If ii hydrogen is used, the catalyst should comprise 0.1 to 2.0 wt. % of a hydrogenation/dehydrogenation component selected from Group VIIIA of the Periodic Table, especially platinum, palladium, or nickel.

The metal-containing macrostructures may find particular application in reactions involving aromatization and/or dehydrogenation. They are particularly useful in a process for the dehydrocyclization and/or isomerization of acyclic hydrocarbons in which the hydrocarbons are contacted at a temperature of from 370° C. to 600° C., preferably from 430° C. to 550° C. with the macrostructure catalyst, preferably comprised of zeolite L particles joined together to form an interconnected three dimensional network, preferably having at least 90% of the exchangeable cations as alkali metal ions and incorporating at least one Group VIII metal having dehydrogenating activity, so as to convert at least part of the acyclic hydrocarbons into aromatic hydrocarbons.

The aliphatic hydrocarbons may be straight or branched chain acyclic hydrocarbons, and particularly paraffins such as hexane, although mixtures of hydrocarbons may also be used such as paraffin fractions containing a range of alkanes possibly with minor amounts of other hydrocarbons. Cycloaliphatic hydrocarbon such as methylcyclopentane may also be used. In a preferred embodiment, the feed to a process for preparing aromatic hydrocarbons and particularly benzene comprises hexanes. The temperature of the catalytic reaction may be from 370° C. to 600° C., preferably 430° C. to 550° C. and preferably pressures in excess of atmospheric are used, for example up to 2000 KPa, more preferably 500 to 1000 KPa. Hydrogen is usually employed in the formation of aromatic hydrocarbons preferably with a hydrogen to feed ratio of less than 10.

The metal-containing macrostructures may find particular application in the vapor phase disproportionation of toluene. Such vapor phase disproportionation comprises contacting toluene under disproportionation conditions with the metal-containing macrostructures to yield a product mixture which comprises a mixture of unreacted (unconverted) toluene and benzene and xylene. The macrostructures would contain an intermediate pore size zeolite (e.g., MFI type) crystals that are coated with at least one metal effective in reducing surface active sites in the zeolite crystals. In the more preferred embodiment, the catalyst is first selectivated prior to use in the disproportionation process. Processes for selectivating the catalyst are known to persons skilled in the art. For instance, selectivation may be accomplished by exposing the catalyst in a reactor bed to a thermally decomposable organic compound, e.g., toluene, at a temperature in excess of the decomposition temperature of said compound, e.g., from about 480° C. to about 650° C., more preferably 540° C. to 650° C., at a WHSV in the range of from about 0.1 to 20 lbs. of feed per pound of catalyst per hour, at a pressure in the range of from about 1 to 100 atmospheres, and in the presence of 0 to about 2 moles of hydrogen, more preferably from about 0.1 to about 2 moles of hydrogen per mole of organic compound, and optionally in the presence of 0–10 moles of nitrogen or another inert gas per mole of organic compound. This process is conducted for a period of time until a sufficient quantity of coke has deposited on the catalyst surface, generally at least about 2% by weight and more preferably from about 8 to about 40% by weight of coke. In a preferred embodiment, such a selectivation process is conducted in the presence of hydrogen in order to prevent rampant formation of coke on the catalyst.

Selectivation of the catalyst can also be accomplished by treating in the catalyst with a selectivation agent such as an organosilicon compound. The silica compounds may comprise polysiloxane including silicone and siloxanes, and a silane including disilanes and alkoxysilanes.

Silicone compounds that find particular application can be represented by the formula:

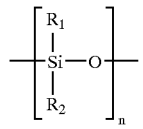

wherein $R_1$ is hydrogen, fluoride, hydroxy, alkyl, aralkyl, alkaryl or fluoro-alkyl. The hydrocarbon substituents generally contain from 1 to 10 carbon atoms and preferably are methyl or ethyl groups. $R_2$ is selected from the same group as $R_1$, and n is an integer of at least 2 and generally in the range of 2 to 1000. The molecular weight of the silicone compound employed is generally between 80 and 20,000 and preferably 150 to 10,000. Representative silicone compounds included dimethylsilicone, diethylsilicone, phenylmethylsilicone, methylhydrogensilicone, ethylhydrogensilicone, phenylhydrogensilicone, methylethylsilicone, phenylethylsilicone, diphenylsilicone, methyltrifluoropropylsilicone, ethyltrifluoropropylsilicone, tetrachlorophenyl methyl silicone, tetrachlorophenylethyl silicone, tetrachlorophenylhydrogen silicone, tetrachlorophenylphenyl silicone, methylvinylsilicone and ethylvinylsilicone. The silicone compound need not be linear but may be cyclic as for example hexamethylcyclotrisiloxane, octamethylcyclotetrasiloxane, hexaphenylcyclotrisiloxane and octaphenylcyclotetrasiloxane. Mixtures of these compounds may also be used as well as silicones with other functional groups.

Useful siloxanes or polysiloxanes include as non-limiting examples hexamethylcyclotrisiloxane, octamethylcyclotetrasiloxane, decamethylcyclopentasiloxane, hexamethyldisiloxane, octamethytrisiloxane, decamethyltetrasiloxane, hexaethylcyclotrisiloxane, octaethylcyclo tetrasiloxane, hexaphenylcyclotrisiloxane and octaphenylcyclo tetrasiloxane.

Useful silanes, disilanes, or alkoxysilanes include organic substituted silanes having the general formula:

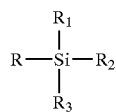

wherein R is a reactive group such as hydrogen, alkoxy, halogen, carboxy, amino, acetamide, trialkylsilyoxy $R_1$, $R_2$ and $R_3$ can be the same as R or can be an organic radical which may include alkyl of from 1 to 40 carbon atoms, alkyl or aryl carboxylic acid wherein the organic portion of the alkyl contains 1 to 30 carbon atoms and the aryl group contains 6 to 24 carbon which may be further substituted, alkylaryl and arylalkyl groups containing 7 to 30 carbon atoms. Preferably, the alkyl group for an alkyl silane is between 1 and 4 carbon atoms in chain length.

When used for the vapor phase disproportionation of toluene, the catalyst preferably comprises an aluminosilicate MFI-type zeolite having a silica to alumina mole ratio of from about 20 to about 200:1, preferably, 25:1 to about 120:1, and the crystals preferably have a mass mean diameter of from about 3 to 6 microns. The binder preferably is a MFI-type zeolite having an average particle size of less than about 0.1 micron and an alumina to silica mole ratio in excess of about 200:1.

Once the catalyst has been selectivated to the desired degree, reactor selectivation conditions are changed to disproportionation conditions. Disproportionation conditions include a temperature between about 375° C. and 550° C., more preferably between about 400° C. and 485° C., at a hydrogen to toluene mole ratio of from 0 to about 10, preferably between about 0.1 and 5 and more preferably from about 0.1 to 1, at a pressure between about 1 atmosphere and 100 atmospheres and utilizing WHSV of between about 0.5 and 50.

The disproportionation process may be conducted as a batch, semi-continuous or continuous operation using a fixed or moving bed catalyst system deposited in a reactor bed. The catalyst may be regenerated after coke deactivation by burning off the coke to a desired extent in an oxygen-containing atmosphere at elevated temperatures as known in the art.

The process of the present invention may find particular application in cracking a naphtha feed, e.g., $C_4^+$ naphtha feed, particularly a $C_4^-$ 290° C. naphtha feed to produce low molecular weight olefins, e.g., $C_2$ through $C_4$ olefins, particularly ethylene and propylene. Such a process is preferably carried out by contacting the naphtha feed at temperatures ranging from 500° C. to about 750° C., more preferably 550° C. to 675° C., at a pressure from subatmospheric up to 10 atmospheres, but preferably from about 1 atmosphere to about 3 atmospheres.

The process of the present invention may find particular application in the transalkylation of polyalkylaromatic hydrocarbons. Examples of suitable polyalkylaromatic hydrocarbons include di-, tri-, and tetra-alkyl aromatic hydrocarbons, such as diethylbenzene, triethylbenzene, diethylmethylbenzene (diethyl-toluene), diisopropylbenzene, triisopropylbenzene, diisopropyltoluene, dibutylbenzene, trimethylnaphthalene, tetramethylnaphthalene, dimethylnaphthalene, and the like. Preferred polyalkylaromatic hydrocarbons are the dialkyl benzenes. Particularly preferred polyalkylaromatic hydrocarbons are diisopropylbenzene and diethylbenzene.

The feed used in the transalkylation process will preferably have a molar ratio of aromatic hydrocarbon to polyalkylaromatic hydrocarbon of preferably from about 0.5:1 to about 50:1, and more preferably from about 2:1 to about 20:1. The reaction temperature will preferably range from about 340° C. to 500° C. to maintain at least a partial liquid phase, and the pressure will be preferably in the range of about 50 psig to 1,000 psig, preferably 300 psig to 600 psig. The weight hourly space velocity will range from about 0.1 to 10.

The process of the present invention may find particular application for converting aromatic compounds from paraffins. Example of suitable paraffins including aliphatic hydrocarbons containing 2 to 12 carbon atoms. The hydrocarbons may be straight chain, open or cyclic and may be saturated or unsaturated. Example of hydrocarbons include propane, propylene, n-butane, n-butenes, isobutane, isobutene, and straight- and branch-chain and cyclic pentanes, pentenes, hexanes, hexenes, heptanes, heptenes, octanes, and octenes.

The aromatization conditions include a temperature of from about 200° C. to about 700° C., a pressure of from about 0.1 atmosphere to about 60 atmospheres, a weight hourly space velocity (WHSV) of from about 0.1 to about 400 and a hydrogen/hydrocarbon mole ratio of from about 0 to about 20.

The metal-containing macrostructures comprises crystals of an intermediate pore size zeolite such a MFI type zeolite (example ZSM-5) and the metal preferably is gallium.

The process of the present invention may find particular application for partial oxidizing hydrocarbons to form oxidized hydrocarbon products with oxidants, e.g. oxygen, air, hydrogen peroxide, t-butyl hydrogen peroxide, form oxidized hydrocarbon products, such as alcohol, ketone, aldehyde, carboxylic acid in gas phase reaction or liquid phase reaction. Exemplary conversion conditions include a temperature from 25° C. to 500° C., a pressure of from 0 to 500 psig and a LHSV of from 0.01 to 10. Example of hydrocarbons including aliphatic hydrocarbons containing 2 to 12 carbon atoms, cycloparaffins, aromatics. The hydrocarbons may be straight chain, open or cyclic and may be saturated or unsaturated. Example of hydrocarbons include propane, propylene, n-butane, n-butenes, isobutane, isobutene, and straight- and branch-chain and cyclic pentanes, pentenes, hexanes, and hexenes, and toluene, xylenes, dimethylnaphthalenes.

The metal-containing macrostructures may also be used for the catalytic reduction of emissions such as hydrocarbons, carbon monooxide, and oxides of nitrogen, in a gas stream from an exhaust system of an internal combustion engine. Typically the gas stream will contain oxygen, often a stoichiometric excess thereof. The metal-containing macrostructures are used for this purpose by contacting the gas stream with the metal-containing macrostructures. The metal-containing macrostructures also have application in the catalytic reduction of nitrogen oxides in flue gases.

EXAMPLE 1

I. Preparation of Catalyst A-Macrostructures Comprising ZSM-5 and Palladium

A 1M HCl solution containing 0.01M palladium (II) chloride ($PdCl_2$) was prepared in a beaker by dissolving the palladium chloride in a 1M HCl solution. Next, a macroporous strongly basic anion exchanger sold under the tradename DOWEX MSA-1 [chloride form] was added to the contents of the beaker. The weight ratio of resin to Pd was 1:10 (10 grams of resin and 100 grains of Pd solution). Next, the beaker was placed in a shaker for one hour. The particles were then separated, rinsed several times with distilled water, filtered, and dried at 105° C.

In an autoclave, 22 grams of a synthesis solution with the molar composition: 0.31 $Na_2O$:9TPAOH:0.25$Al_2O_3$:25 $SiO_2$:405 $H_2O$ were added to 1.1 gram of the dried palladium-loaded ion exchanger. The mixture of ion exchanger and synthesis solution was aged for one hour at room temperature and then heated at 170° C. for 17 hours. Next, the particles were separated from the zeolite crystallized in bulk, treated in a 0.1M ammonia solution in an ultrasound bath for 5 minutes, rinsed several times with distilled water and then dried at 60° C. The ion exchanger was then removed by calcination at 600° C. in air for 5 hours, after heating to this temperature at a rate of 1° C./min.

X-ray diffractometry showed zeolite ZSM-5 of high crystallinity and PdO peaks of low intensity were also observed. ICP elementary analysis show that the silica to alumina mole ratio of the ZSM-5 was 51 and the Pd loading was 1.7 weight percent.

II. Preparation of Catalyst B-Macrostructures Comprising ZSM-5 and Platinum

In a beaker, MSA-1 ion exchange resin was exchanged with 0.01M solution of chlorplantic ($H_2PtCl_6$). The weight ratio of resin to Pt was 1:5. (10 grams of resin and 50 grams of Pt solution). The beaker was placed in a shaker for one hour. The particles were then separated, rinsed several times with distilled water, filtered, and dried at 105° C.

In an autoclave, 20 grams of a synthesis solution with the molar composition: 0.31 $Na_2O$:9TPAOH:0.25$Al_2O_3$:25 $SiO_2$:405 $H_2O$ were added to 1.0 gram of the dried platinum-loaded ion exchanger. The mixture of ion exchanger and synthesis solution was aged for one hour at room temperature and then heated at 170° C. for 17 hours. Next, the particles were separated from the zeolite crystallized in bulk, treated in a 0.1M ammonia solution in an ultrasound bath for 5 minutes, rinsed several times with distilled water and then dried at 60° C. The ion exchanger was then removed by calcination at 600° C. in air for 5 hours, after heating to this temperature at a rate of 1° C./min.

X-ray diffractometry showed zeolite ZSM-5 of high crystallinity. ICP elementary analysis show that the silica to alumina mole ratio of the ZSM-5 was 54 and platinum loading was 1.7 weight percent.

EXAMPLE 2

Samples A and B were each tested for xylene isomerization/ethylbenzene dealkylation. The test was carried out by first packing fifty milligrams of 40–60 mesh catalyst in a stainless steel reactor. The catalyst was pretreated at 450° C. with $H_2$ for two hours followed by contact with co-feed of 50:50 ethylbenzene:m-xylene and hydrogen. Total pressure of reaction was controlled at 54 psia. The partial pressure of ethylbenzene feed was 3.4 psia, partial pressure of m-xylene feed was 3.4 psia, and partial pressure of $H_2$ feed was 47.2 psia. Hydrocarbon flowrate was 7.7 $\mu$l/min. The hydrogen stream was controlled by a Brooks mass flow controller and the hydrocarbon feed stream was pumped by a syringe pump. The temperature investigated in the tests ranged from 200 to 500° C. All products were analyzed by an on-line HP 6890 GC equipped with a Chirasil DEX CP column. Table I below shows the results of the tests for Sample A. Table II below shows the results of the tests for Sample B

TABLE I

|  | 200° C. | 300° C. | 400° C. | 500° C. |
|---|---|---|---|---|
| Ethylbenzene dealkylated (%) | 30 | 31 | 35.5 | 30 |
| m-xylene isomerized (%) | 31 | 35 | 43 | 46 |
| pX:mX:oX | 16:69:14 | 20:65:15 | 24:57:19 | 25:54:21 |

TABLE II

|  | 200° C. | 300° C. | 400° C. | 500° C. |
|---|---|---|---|---|
| Ethylbenzene dealkylated (%) | 2 | 3 | 65 | 85 |
| m-xylene isomerized (%) | 17 | 18.5 | 39 | 45 |
| pX:mX:oX | 12.5:83:4.5 | 14:81.5:4.5 | 22:61:17 | 24:55:20 |

The results of the tests show that Catalysts A and B were effective for EB conversion over a wide range of temperatures. Catalyst A was more effective at the higher temperatures in producing equilibrium amounts of xylenes product.

EXAMPLE 3

Preparation of Macrostructures Comprising ZSM-5 and Chromium

In a beaker, 4 grams of MSA-2 ion exchange resin was exchanged with 40 g of a chromium-EDTA complex solution. The beaker was placed in a shaker for one hour. The particles were then separated, rinsed several times with distilled water, filtered, and dried at 105° C.

In an autoclave, 1.5 gram of the dried chromium-loaded ion exchanger were treated with 30 grams of a ZSM-5 synthesis solution with the following molar composition: 0.31 $Na_2O$:9TPAOH:0.25$Al_2O_3$:25 $SiO_2$:405 $H_2O$. The mixture of ion exchanger and synthesis solution was aged for one hour at room temperature and then heated at 170° C. for 17 hours. After the synthesis, the resin-zeolite composites were separated from the zeolite crystallized in bulk, treated in a 0.1M ammonia solution in an ultrasound bath for 5 minutes, rinsed several times with distilled water and then dried at 60° C. The ion exchanger was then removed by calcination at 600° C. in air for 5 hours, after heating to this temperature at a rate of 1° C./min.

X-ray diffractometry showed zeolite ZSM-5 of high crystallinity. The density of the particles was determined to be 0.26 g/cc. The amount of chromium loaded into the macrostructures was 0.7 gram.

EXAMPLE 4

Preparation of Macrostructures Comprising Zeolite Beta and Palladium

DOWEX MSA-1 [chloride form] ion exchanger was exchanged with a 0.01M palladium (II) chloride ($PdCl_2$) solution that was prepared by dissolving the palladium chloride in a 1M HCl solution. The weight ratio of resin to Pd was 1:10 (10 grams of resin and 100 grams of Pd solution). Next, the beaker was placed in a shaker for one hour. The particles were then separated, rinsed several times with distilled water, filtered, and dried at 105° C.

In an autoclave, 1.5 gram of the dried palladium-loaded ion exchanger were mixed with 16 grams of a zeolite Beta synthesis solution with the following molar composition: 0.31 $Na_2O$:9TEAOH:0.5$Al_2O_3$:25 $SiO_2$:295 $H_2O$. The mixture of ion exchanger and synthesis solution was heated at 170° C. for 24 hours. After the synthesis, the resin-zeolite composites were separated from the zeolite crystallized in bulk, treated in a 0.1M ammonia solution in an ultrasound bath for 5 minutes, rinsed several times with distilled water and then dried at −60° C. The ion exchanger was then removed by calcination at 600° C. in air for 5 hours, after heating to this temperature at a rate of 1° C./min.

The specific surface area was measured by nitrogen adsorption at 450 $m^2$/g. ICP elementary analysis showed that the silica to alumina mole ratio of the zeolite Beta was 33 and the Pd loading was 4835 ppm.

EXAMPLE 5

Preparation of Macrostructures Comprising Zeolite Beta and Cobalt 2 g of synthesis solution were mixed with 4 g of 0.1 M solutions of $Co(NO_3)_2.6H_2O$. Next, 2 grams of DOWEX MSA-1 [chloride form] ion exchanger was added to the mixture and the mixture was shaken for one hour. The particles were washed with distilled water and dried at 105° C. for 2 hours.

The dried cobalt-loaded ion exchanger were mixed with a zeolite Beta synthesis solution with the following molar composition: 0.31 $Na_2O$:9TEAOH:0.5$Al_2O_3$:25$SiO_2$:295 $H_2O$. The mixture had a weight ratio of 1:10 (1 gram composite particles with 10 grams of synthesis solution). The mixture of ion exchanger and synthesis solution was heated at 170° C. for 24 hours. After the synthesis, the resin-zeolite composites were separated from the zeolite crystallized in bulk, treated in a 0.1M ammonia solution in an ultrasound bath for 5 minutes, rinsed several times with distilled water and then dried at 60° C. The ion exchanger was then removed by calcination at 600° C. in air for 5 hours, after heating to this temperature at a rate of 1° C./min.

X-ray diffractometry showed zeolite Beta of high crystallinity. SEM showed particles having a size of less than 0.5 μm. The density was 0.51 g/cc.

The zeolite Beta macrostructures were tested in the partial oxidation of decane with tert-butyl hydrogen peroxide. The test was carried out by adding one hundred milligram of the macrostructures to 10 ml of decane and 30 ml of tert-butyl hydrogen peroxide solution. The reaction mixture was stirred with a magnetic stir bar and heated at 80° C. in a three neck round bottom flask equipped with a reflux. Products were collected after 1 hour and analyzed by HP5973 GC/MS equipped with a 60 meter HP-IMS column. The GC-MS analysis showed that 10% of decane had been oxidized to decane ketones.

What is claimed is:

1. A catalyst suitable for use in hydrocarbon conversion, said catalyst comprising: at least one porous macrostructure comprised of: (a) a three-dimensional network of self bound particles of porous inorganic material; and, (b) at least one metal, said particles occupying less than 75% of the total volume of said at least one macrostructure and being joined together to form a three-dimensional interconnected network of pores.

2. The catalyst recited in claim 1, wherein said porous inorganic material is comprised of molecular sieve.

3. The catalyst recited in claim 2, wherein said network comprises pores having diameters greater than about 20 Å.

4. The catalyst recited in claim 3, wherein said porous inorganic material is a large pore or intermediate pore size molecular sieve.

5. The catalyst recited in claim 4, wherein the structure type of said molecular sieve is selected from the group consisting of LTL, FAU, MOR, *BEA, MFI, ML, MTW, MTT, MFS, FER, and TON.

6. The catalyst recited in claim 4, wherein said molecular sieve is selected from the group consisting of zeolite L, zeolite X, zeolite Y, mordenite, zeolite Beta, ZSM-5, ZSM-11, ZSM-22, silicalite 1 and silicalite 2.

7. The catalyst recited in claim 3, wherein said crystalline molecular sieve is a ZSM-5 or silicalite 1.

8. The catalyst recited in claim 3, wherein said particles have an average particle size of less than 500 nm.

9. The catalyst recited in recited in claim 3, wherein said particles are joined together as a result of the synthesis of the at least one macrostructure.

10. The catalyst in claim 3, wherein said particles occupy less than 50% of the total volume of said macrostructures.

11. The catalyst recited in claim 1, wherein said porous inorganic material is mesoporous inorganic material.

12. The catalyst recited in claim 11, wherein said mesoporous inorganic material is selected from the group consisting of silica, aluminum silicate, alumina, MCM-41, and MCM-48.

13. The catalyst recited in claim 3, wherein said at least one metal is a hydrogenation/dehydrogenation metal.

14. The catalyst recited in claim 4, wherein said at least one metal is effective for reducing the strength of or the number of acid sites on said porous inorganic material.

15. The catalyst recited in claim 4, wherein said at least one macrostructure does not contain significant amounts of amorphous materials.

16. A process of preparing a catalyst comprising; at least one porous macrostructure comprised of: (a) a three-dimensional network of self bound particles of porous inorganic material; and, (b) at least one metal said particles occupying less than 75% of the total volume of said at least one macrostructure and being joined together to form a three-dimensional interconnected network comprised of pores; which method comprises the steps of: (i) forming an admixture comprising, a porous organic ion exchanger and a synthesis mixture which occupies at least a portion of the pore space of said porous organic ion exchanger and is capable of forming said porous inorganic material; (ii) converting said synthesis mixture to said porous inorganic material; and, (iii) removing said porous organic ion exchanger; wherein said at least one metal is present in said admixture of step (i), or is added during the conversion of step, (ii), or is added to at least one macrostructure before the removal in step (iii) of the porous organic ion exchanger and after the formation in step (ii) of the porous inorganic, material, or is added to said at least one macrostructure after the removal in step (iii) of the porous organic ion exchanger, or combinations thereof.

17. The process recited in claim 16 wherein said porous inorganic material is comprised of molecular sieve.

18. The process recited in claim 17, wherein said network comprises pores having diameters greater than about 20 Å.

19. The process recited in claim 18, wherein said porous inorganic material is a large pore or intermediate pore size molecular sieve.

20. The process recited in claim 19, wherein said porous organic ion exchanger is a porous polymer-based anionic exchanger.

21. The process recited claim 20, wherein said organic ion exchanger is a macroreticular ion exchanger.

22. The process recited in claim 20, wherein the conversion of the synthesis mixture is carried out under hydrothermal conditions.

23. The process recited in claim 21, wherein said porous polymer-based anionic ion-exchanger has an ion-exchange capacity greater than about 1 mEq/g of dry porous anionic ion-exchanger.

24. The process recited in claim 20, wherein said porous polymer-based anionic ion-exchanger is a strongly basic anion-exchange resin containing quarternary ammonium groups.

25. The process recited in claim 21, wherein the structure type of said molecular sieve is selected from the group consisting of LTL, FAU, MOR, *BEA, MFI, MEL, MTW, MTT, MFS, FER, and TON.

26. The process recited in claim 25, wherein said porous organic ion exchanger is removed by either an oxidation process or dissolution.

27. The process recited in claim 25, wherein said at least one metal is present on the porous organic ion exchanger before forming the synthesis mixture of step (i).

28. The process recited in claim 25, wherein said at least one metal is included in the porous organic ion exchanger by depositation, adsorption or ion exchange.

29. The process recited in claim 25, wherein the at least one metal is added to said admixture of step (i) during the preparation, after the formation, or both, of said admixture.

30. The process recited in claim 25, wherein said at least one metal is added during the conversion of step (ii).

31. The process recited in claim 25, wherein said at least one metal is added to the at least one macrostructure before the removal in step (iii) of the porous organic ion exchanger and after the formation in step (ii) of the porous inorganic material.

32. The process recited in claim 25, wherein said at least one metal is added to said at least one macrostructure after the removal in step (iii) of the porous organic ion, exchanger.

33. The process recited in claim 25, wherein said macrostructures have at least one dimension greater than about 1.0 mm.

34. The process recited in claim 25, wherein said at least one macrostructure does not contain significant amounts of amorphous materials.

35. The process recited in claim 25, wherein said at least one macrostructure has a density of less than 0.50 g/cc.

36. The process recited in claim 25, wherein said particles are joined together by means other than by physical binding of the particles.

37. The process recited in claim 25, wherein said at least one metal is a hydrogenation/dehydrogenation metal.

38. The process recited in claim 25, said at least one metal is effective for reducing the strength of or the number of acid sites on said porous inorganic material.

39. The process recited in claim 16, wherein said porous inorganic material is mesoporous inorganic material.

40. The process recited in claim 39, wherein said mesoporous inorganic material is selected from the group consisting of silica, aluminum silicate, alumina, MCM-41, and MCM-48.

41. The process recited in claim 17, wherein said particles occupy less than 50% of the total volume of said macrostructures.

42. A process for converting hydrocarbons comprising contacting a hydrocarbon feedstream under hydrocarbon conversion conditions with a catalyst comprising: at least one porous macrostructure comprised of: (a) a three-dimensional network of self bound particles of porous inorganic material; and, (b) at least one metal, said particles occupying less than 75% of the total volume of said at least one macrostructure and being joined together to form a three-dimensional interconnected network of pores.

43. The process recited in claim 42 wherein said catalyst is prepared by a process comprising the steps of: (i) forming an admixture comprising, a porous organic ion exchanger and a synthesis mixture which occupies at least a portion of the pore space of said porous organic ion exchanger and is capable of forming said porous inorganic material; (ii) converting said synthesis mixture to said porous inorganic material; and, (iii) removing said porous organic ion exchanger; wherein said at least one metal is present in said admixture of step (i), or is added during the conversion of step, (ii), or is added to at least one macrostructure before the removal in step (iii) of the porous organic ion exchanger and after the formation in step (ii) of the porous inorganic material, or is added to said at least one macrostructure after the removal in step (iii) of the porous organic ion exchanger, or combinations thereof.

44. The process recited in claim 42 wherein the hydrocarbon conversion is carried out at conditions of about 0° C. to about 760° C., a pressure of from about 0.1 atmosphere (bar) to about 200 atmospheres (bar), a weight hourly space velocity of from about 0.08 $hr^{-1}$ to about 2,000 $hr^{-1}$.

45. The process recited in claim 44, wherein the hydrocarbon conversion is selected from the group consisting of cracking of hydrocarbons, isomerization of alkyl aromatics, disproportionation of toluene, disproportionation of cumene and ethylbenzene, transalkylation of aromatics, alkylation of aromatics, alkylation of naphthalene or alkylnaphthalene to form dialkylnaphthalene, reforming of naphtha to aromatics, conversion of paraffins and/or olefins to aromatics, conversion of oxygenates to hydrocarbon products, cracking of naphtha to light olefins, and dewaxing of hydrocarbons.

46. The process recited in claim 44, wherein said porous inorganic material is mesoporous inorganic material.

47. The process recited in claim 44, wherein said porous inorganic material is comprised of molecular sieve.

48. The process recited in claim 47, wherein said network comprises pores having diameters greater than about 20 Å.

49. The process recited in claim 47, wherein said porous inorganic material is a large pore or intermediate pore size molecular sieve.

50. The process recited in claim 49, wherein the structure type of said molecular sieve is selected from the group consisting of LTL, FAU, MOR, *BEA, MFI, MEL, MTW, MTT, MFS, FER, and TON.

51. The process recited in claim 43, wherein the structure type of said molecular sieve is selected from the group consisting of LTL, FAU, MOR, BEA, MFI, MEL, MTW, MTT, MFS, FER, and TON.

52. The process recited in claim 51, wherein said at least one metal is present on the porous organic ion exchanger before forming the synthesis mixture of step (i).

53. The process recited in claim 51, wherein said at least one metal is included in the porous organic ion exchanger by depositation, adsorption, or ion exchange.

54. The process recited in claim 51, wherein the at least one metal is added to said admixture of step (i) during the preparation, after the formation, or both, of said admixture.

55. The process recited in claim 51, wherein said at least one metal is added to the at least one macrostructure before the removal in step (iii) of the porous organic ion exchanger and after the formation in step (ii) of the porous inorganic material.

56. The process recited in claim 51, wherein said macrostructures have at least one dimension greater than about 1.0 mm.

57. The process recited in claim 51, wherein said porous organic ion exchanger is a porous polymer-based anionic exchanger.

58. The process recited in claim 57, wherein said porous polymer-based anionic ion-exchanger has an ion-exchange capacity greater than about 1 mEq/g of dry porous anionic ion-exchanger.

59. The process recited in claim 44, wherein said hydrocarbon conversion comprises the partial oxidizing hydrocarbons by contacting a hydrocarbon feedstream under oxidation conditions with oxidants.

60. The process recited in claim 59, wherein said oxidants are selected from the group consisting of air, oxygen, organic peroxides, inorganic oxides.

61. The process of claim 60, wherein said hydrocarbon feedstream is selected is from the group consisting of paraffins, olefins, aromatics, and mixtures thereof.

62. The process for reducing emissions of hydrocarbons, carbon monoxide, oxides of nitrogen, or mixtures thereof in a gas stream comprising contacting said gas stream with a catalyst comprising: at least one porous macrostructure comprised of: (a) a three-dimensional network of self bound particles of porous inorganic material; and, (b) at least one metal, said particles occupying less than 75% of the total volume of said at least one macrostructure and being joined together to form a three-dimensional interconnected network of pores.

63. The process recited in claim 62, wherein said gas stream is a gas stream produced by an internal combustion engine.

* * * * *